(12) United States Patent
DeStories et al.

(10) Patent No.: US 11,451,001 B2
(45) Date of Patent: Sep. 20, 2022

(54) DEVICE FOR INSERTING WIRES INTO A WIRING HARNESS CONNECTOR

(71) Applicant: The Boeing Company, Chicago, IL (US)

(72) Inventors: Jason G. DeStories, Mesa, AZ (US); James R. Crocco, Gilbert, AZ (US); Michael R. Mercer, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 127 days.

(21) Appl. No.: 16/775,993

(22) Filed: Jan. 29, 2020

(65) Prior Publication Data
US 2021/0234324 A1    Jul. 29, 2021

(51) Int. Cl.
*H01R 43/20* (2006.01)
*H01B 13/012* (2006.01)
*F21V 8/00* (2006.01)
*H01B 9/00* (2006.01)
*H01B 7/00* (2006.01)

(52) U.S. Cl.
CPC .......... *H01R 43/20* (2013.01); *G02B 6/0006* (2013.01); *G02B 6/0008* (2013.01); *H01B 7/0045* (2013.01); *H01B 9/005* (2013.01); *H01B 13/01209* (2013.01); *H01B 13/01236* (2013.01)

(58) Field of Classification Search
CPC .. G02B 6/0006; G02B 6/0008; H01B 7/0045; H01B 9/005; H01B 13/01209; H01B 13/01236; H01R 43/20
See application file for complete search history.

(56) References Cited

U.S. PATENT DOCUMENTS

| 5,280,281 A | 1/1994 | Strangio |
| 9,589,390 B2 | 3/2017 | DeStories et al. |
| 9,985,406 B2 | 5/2018 | Crocco et al. |

FOREIGN PATENT DOCUMENTS

WO    2019238445 A1  * 12/2019

* cited by examiner

Primary Examiner — Carl J Arbes
(74) Attorney, Agent, or Firm — Sage Patent Group

(57) ABSTRACT

A device for inserting wires into a wiring harness connector includes a light source and an assembly to cause rear illumination of a particular pin cavity of a plurality of pin cavities of the wiring harness connector by light from the light source. Rear illumination of the particular pin cavity indicates the particular pin cavity where a selected wire is to be inserted into the wiring harness connector based on an identification of the selected wire.

21 Claims, 10 Drawing Sheets

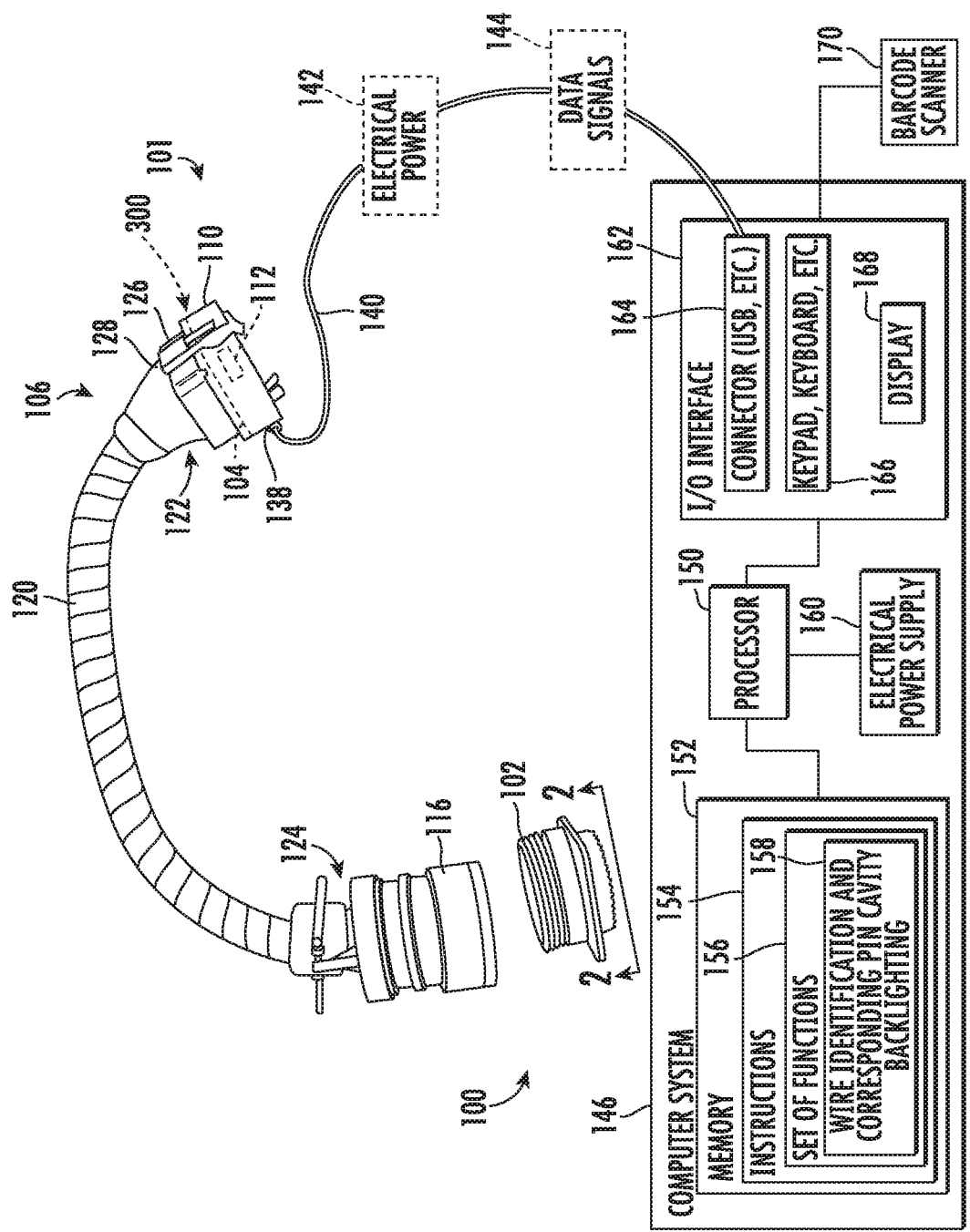

DEVICE FOR INSERTING WIRES INTO A WIRING HARNESS CONNECTOR

FIELD

The present disclosure relates to assembly of wire connectors and more particularly to a device for inserting wires into a wiring harness connector.

BACKGROUND

In the production of wiring harness connectors, a multiplicity of wires are manually inserted into respective holes in the wiring harness connector. Each wire has to be inserted into the correct hole for that particular wire to avoid crossed wires and costly rewiring of the connector. Current aids in assembling wiring harness connectors use projecting light to identify the correct hole for inserting a particular wire. However, projecting light creates shadows as the connector becomes more populated with wires which can cause wiring errors.

SUMMARY

In accordance with an embodiment, a device for inserting wires into a wiring harness connector includes a light source and an assembly to cause rear illumination of a particular pin cavity of a plurality of pin cavities of the wiring harness connector by light from the light source. Rear illumination of the particular pin cavity indicates the particular pin cavity where a selected wire is to be inserted into the wiring harness connector based on an identification of the selected wire.

In accordance with another embodiment, a method for inserting wires into a wiring harness connector includes receiving an identification of a selected wire for insertion into the wiring harness connector. The method also includes rear illuminating a particular pin cavity of a plurality of pin cavities of the wiring harness connector by light from a light source. Rear illuminating the particular pin cavity indicates the particular pin cavity where the selected wire is to be inserted into the wiring harness connector based on the identification of the selected wire.

In accordance with a further embodiment, a system for inserting wires into a wiring harness connector includes a processor and a memory associated with the processor. The memory includes computer-readable program instructions that, when executed by the processor causes the processor to perform a set of functions. The set of functions include receiving an identification of a selected wire for insertion into the wiring harness connector. The set of functions also include rear illuminating a particular pin cavity of a plurality of pin cavities of the wiring harness connector by light from a light source. Rear illuminating the particular pin cavity indicates the particular pin cavity where the selected wire is to be inserted into the wiring harness connector based on the identification of the selected wire.

In accordance with an embodiment and any of the preceding embodiments, the light source includes an array of light sources.

In accordance with an embodiment and any of the preceding embodiments, the device method and system include a microprocessor to control operation of the array of light sources. The microprocessor is configured to illuminate a particular light source of the array of light sources based on the identification of the selected wire. Illumination of the particular light source causes the rear illumination of a corresponding pin cavity of the wiring harness connector to indicate the particular pin cavity where the selected wire is to be inserted into the wiring harness connector based on the identification of the selected wire.

In accordance with an embodiment and any of the preceding embodiments, the array of light sources includes an array of light emitting diodes (LEDs).

In accordance with an embodiment and any of the preceding embodiments, the array of LEDs is arranged in a matrix comprising a predetermined number of columns and rows of LEDs.

In accordance with an embodiment and any of the preceding embodiments, the device, method and system further include a housing enclosing the microprocessor to control operation of the array of light sources. The array of light sources are mounted on a side of the housing. The assembly is releasably attachable to the housing to receive light from the array of light sources.

In accordance with an embodiment and any of the preceding embodiments, the assembly includes a mating connector that is connectable to the wiring harness connector. The mating connector includes a plurality of openings extending through the mating connector. Each of the plurality of openings aligns with a corresponding pin cavity of the wiring harness connector when the mating connector is connected to the wiring harness connector. The assembly also includes a fiber optic cable including a plurality of optical fibers. A first end of each optical fiber is inserted into a respective opening of the plurality of openings of the mating connector. The assembly additionally includes an optical interface adapter configured to optically couple a second end of each optical fiber to an associated light source of the array of light sources.

In accordance with an embodiment and any of the preceding embodiments, the optical interface adapter is configured to releasably attach to a housing including the array of light sources. The second end of each optical fiber interfaces with the associated light source of the array of light sources to receive light from the associated light source when illuminated.

In accordance with an embodiment and any of the preceding embodiments, the assembly is interchangeable with one or more other assemblies. Each other assembly is configured for rear illumination of respective pin cavities in a different type wiring harness connector for inserting wires in the different type wiring harness connector.

In accordance with an embodiment and any of the preceding embodiments, each other assembly includes a mating connector that is connectable to a certain type wiring harness connector.

In accordance with an embodiment and any of the preceding embodiments, the device, method and system further include a speaker electrically connected to a microprocessor. The speaker is configured to provide an audible signal in response to receiving an identification of a next selected wire for insertion into the wiring harness connector.

In accordance with an embodiment and any of the preceding embodiments, the device, method and system further include a universal serial bus (USB) cable. The USB cable is connectable to a computer system to supply electrical power to the device and to provide data signals to a microprocessor in response to the computer system receiving the identification of the selected wire from a user.

In accordance with an embodiment and any of the preceding embodiments, the device, system and method further include translating the identification of the selected wire to the particular pin cavity that is to receive the selected wire using a table of wire identifications for the wiring harness connector based on a type of the wiring harness connector.

In accordance with an embodiment and any of the preceding embodiments, the device, system and method further including retrieving a table of wire identifications based on a type of the wiring harness connector. The table of wire identifications is used to associate pin cavity labels to corresponding light source numbers in an array of light sources to cause rear illumination of a particular pin cavity based on the identification of the selected wire in the table of wire identifications.

In accordance with an embodiment and any of the preceding embodiments, the light source includes an array of light emitting diodes (LEDs) A particular LED of the array of LEDs is illuminated based on the identification of the selected wire. The illumination of the particular LED causes the rear illuminating of the particular pin cavity where the selected wire is to be inserted into the wiring harness connector based on the identification of the selected wire.

In accordance with an embodiment and any of the preceding embodiments, the device, system and method further include tracking the identification of wires selected for inserting into the wiring harness connector and updating a table of wire identifications to designate the identifications of wires that have been selected for insertion.

In accordance with an embodiment and any of the preceding embodiments, the device, system and method further include presenting a list of identifications of wires remaining to be inserted into the wiring harness connector; and allowing selection from the list of identifications of wires remaining to be inserted into the wiring harness connector.

In accordance with an embodiment and any of the preceding embodiments, the device, system and method further include rear illuminating the particular pin cavity where a next selected wire is to be inserted into the wiring harness connector based on the identification of the next selected wire until all wires have been inserted into the wiring harness connector.

In accordance with an embodiment and any of the preceding embodiments, the device, system and method further include tracking if all wires have been inserted into the wiring harness connector; receiving an identification of a next selected wire for insertion into the wiring harness connector in response to wires remaining to be inserted into the wiring harness connector; and rear illuminating a particular pin cavity where the next selected wire is to be inserted into the wiring harness connector based on the identification of the next selected wire until all wires have been inserted into the wiring harness connector.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 1A is an illustration of an example of a system for inserting wires into a wiring harness connector in accordance with an embodiment of the present disclosure.

DETAILED DESCRIPTION

Figure 1B:
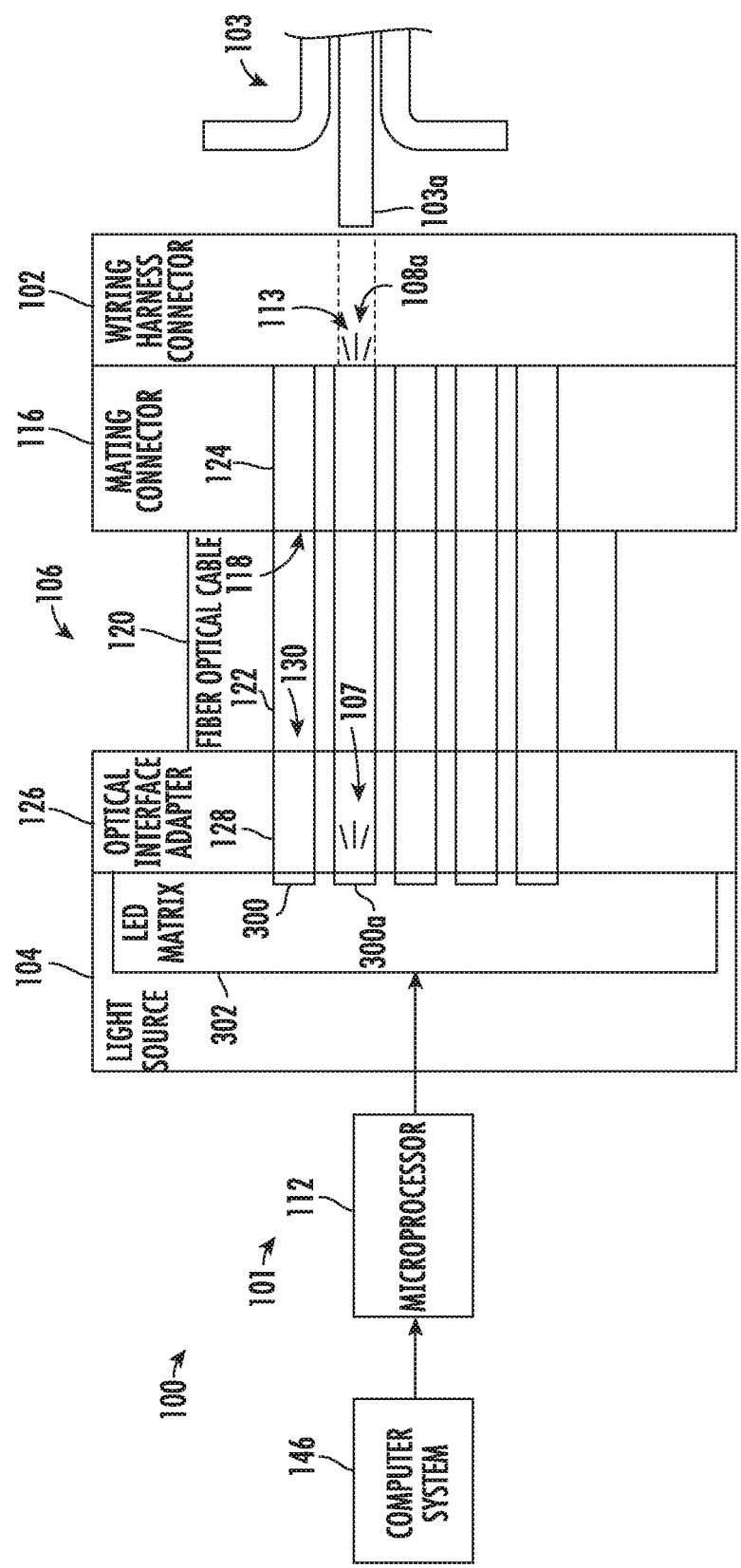
FIG. 1B is a block schematic diagram of the system of FIG. 1A illustrating operation of the system in accordance with an example of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 2:
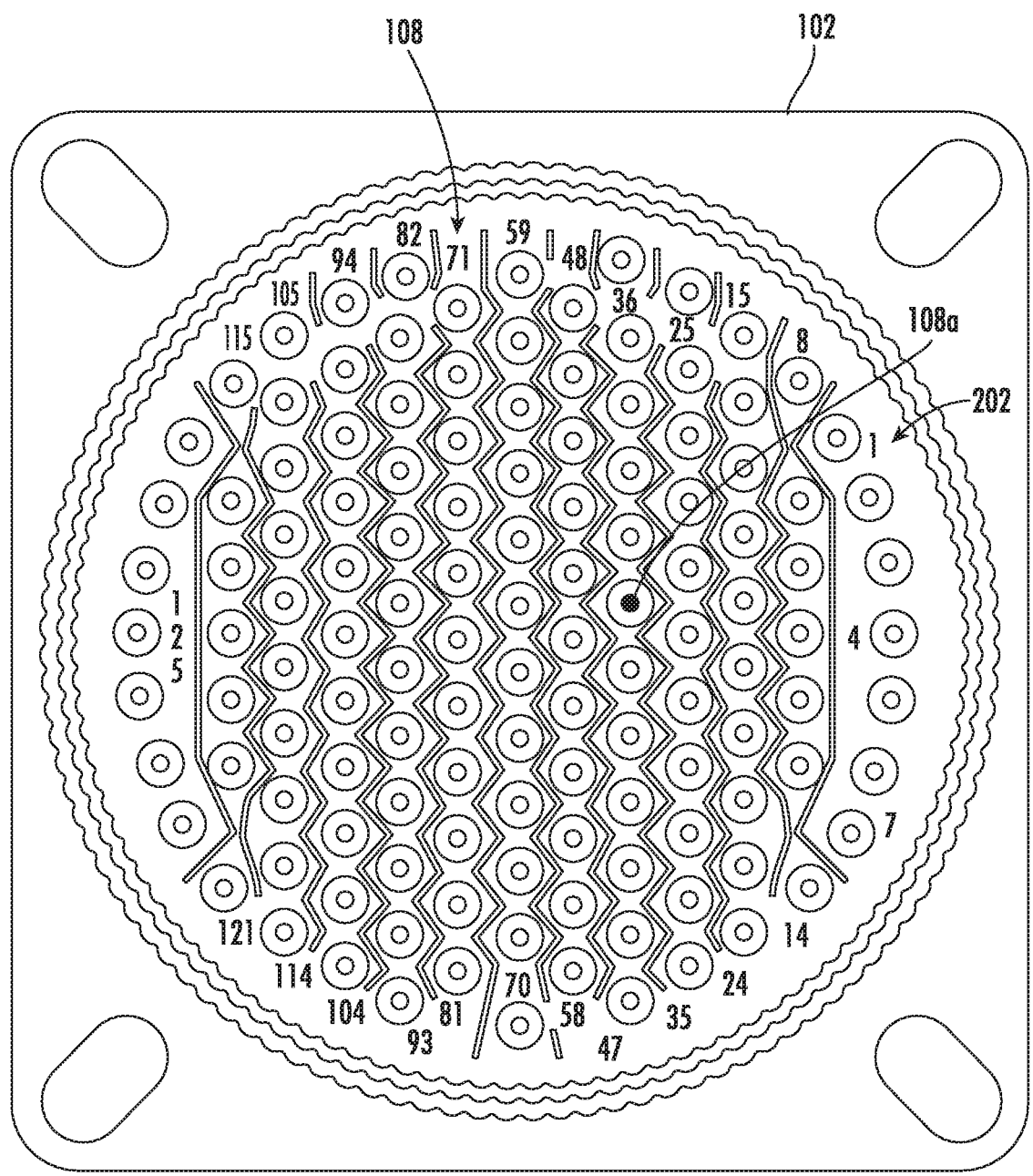
FIG. 2 is an end view of an example of a wiring harness connector in the direction of arrows 2-2 in FIG. 1A.

FIG. 1A is an illustration of an example of a system 100 for inserting wires into a wiring harness connector 102 in accordance with an embodiment of the present disclosure. Referring also to FIG. 1B, FIG. 1B is a block schematic diagram of the system 100 of FIG. 1A illustrating operation of the system 100 in accordance with an example of the present disclosure. The system 100 includes a device 101 for inserting a plurality of wires 103 (FIG. 1B) into a wiring harness connector 102. Referring also to FIG. 2, FIG. 2 is an end view of an example of a wiring harness connector 102 in the direction of arrows 2-2 in FIG. 1A.

Figure 3:
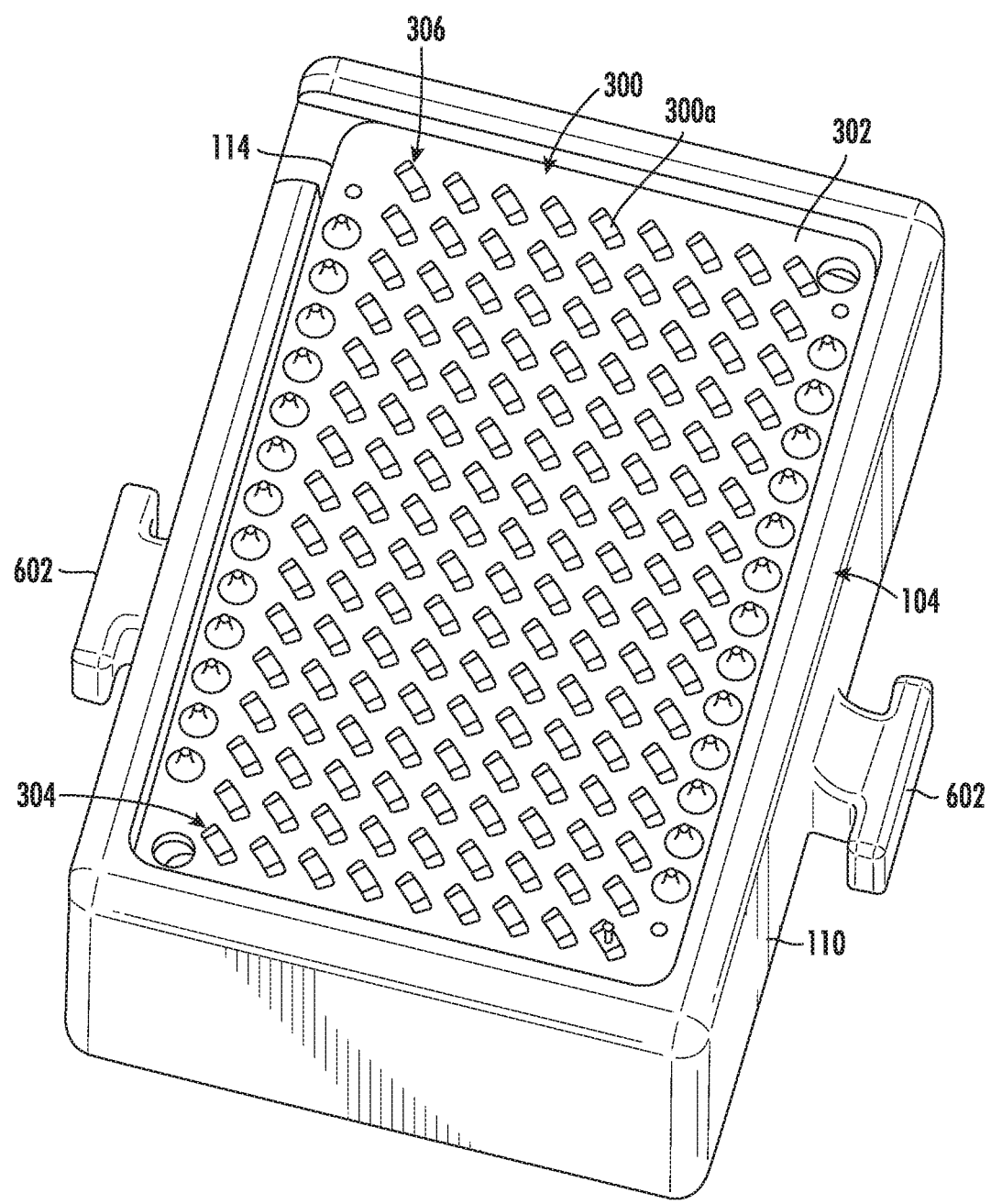
FIG. 3 is a top view of an exemplary array of light emitting diodes (LEDs) in accordance with an embodiment of the present disclosure.

The device 101 includes a light source 104 and an assembly 106 to cause rear illumination 113 (FIGS. 1B and 2) of a particular pin cavity 108a of a plurality of pin cavities 108 of the wiring harness connector 102 by light 107 (FIG. 1B) from the light source 104. The light 107 from the light source 104 indicates the particular pin cavity 108a where a selected wire 103a (FIG. 1B) of the plurality of wires 103 is to be inserted into the wiring harness connector 102 based on an identification of the selected wire 103a. The light source 104 is hidden from view in FIGS. 1A and 1s illustrated by a broken or dashed line in FIG. 1A. In accordance with an example, the light source 104 is an array of light sources 104. For example, the array of light sources are an array of light emitting diodes (LEDs) 300 as shown in FIGS. 1B and 3. FIG. 3 is a top view of an exemplary array of LEDs 300 in accordance with an embodiment of the present disclosure. In the example in FIG. 3, the array of LEDs 300 are arranged in a matrix 302 including a predetermined number of columns 304 and rows 306 of LEDs 300.

Figure 4:
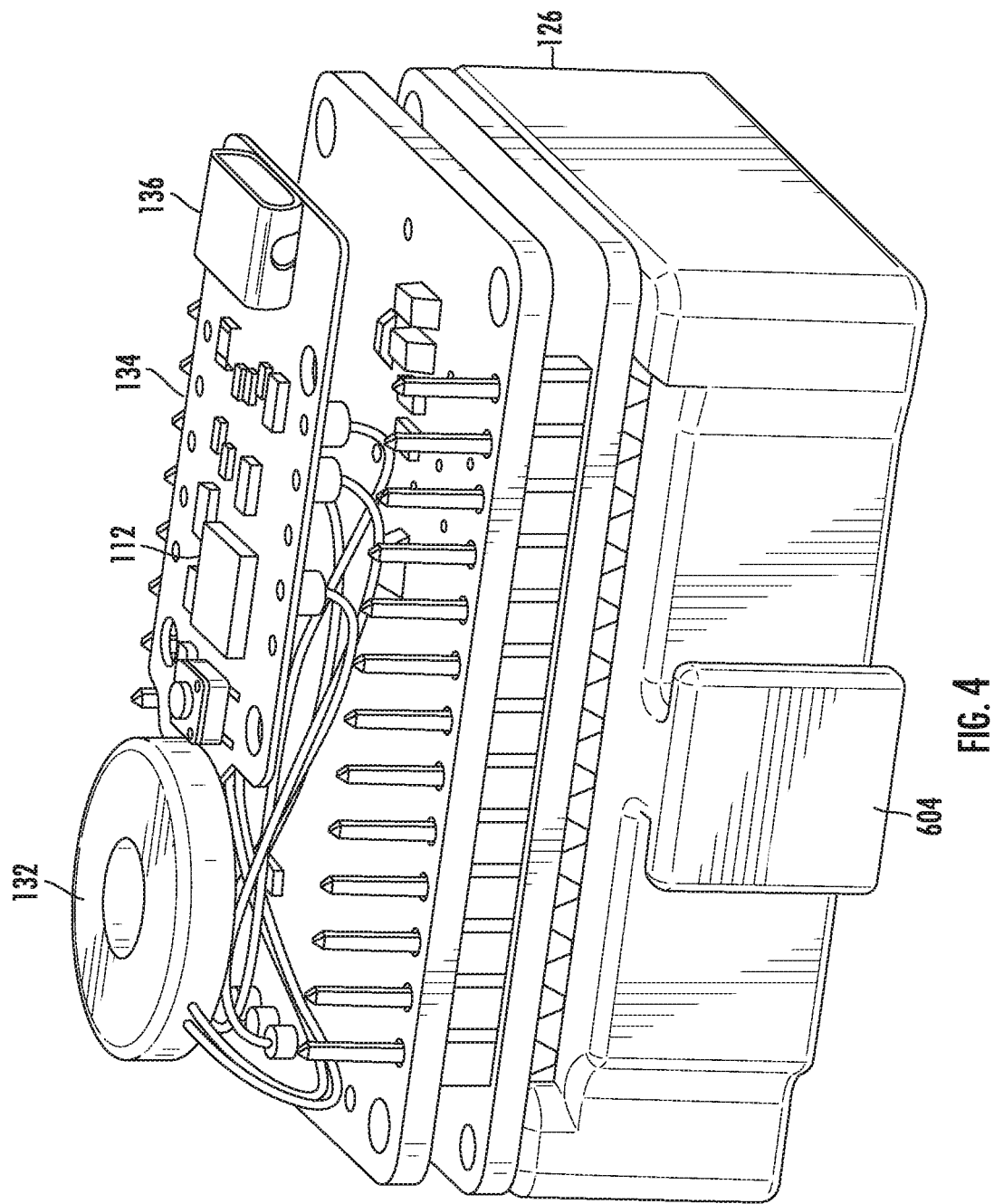
FIG. 4 is a perspective view of an example of a circuit board including a microprocessor for controlling operation of an array LEDs in accordance with an embodiment of the present disclosure.

The device 101 also includes a housing 110 (FIGS. 1A and 3) and a microprocessor 112 (FIGS. 1A, 1B and 4). The housing 110 encloses the microprocessor 112 and is not visible in FIG. 1A. The microprocessor 112 is illustrated by a broken or dashed line in FIG. 1A. Referring to FIG. 3, the array of LEDs 300 is mounted on a side 114 of the housing 110. The assembly 106 is releasably attachable to the housing 110 to receive light from the array of LEDs 300. The housing 110 is also referred to herein as a light emitting diode (LED) matrix housing 110.

The device 101 includes the microprocessor 112 (FIG. 1B and FIG. 4) to control operation of the array of LEDs 300. The microprocessor 112 is configured to illuminate a particular LED 300a (FIG. 1B and FIG. 3) of the array of LEDs 300 based on the identification of the selected wire 103a (FIG. 1B) for insertion into the wiring harness connector 102. Illumination of the particular LED 300a causes the rear illumination 113 (FIG. 1B) of a corresponding pin cavity 108a (FIG. 1B and FIG. 2) of the wiring harness connector 102 to indicate the particular pin cavity 108a where the selected wire 103a is to be inserted into the wiring harness connector 102 based on the identification of the selected wire 103a.

Figure 5:
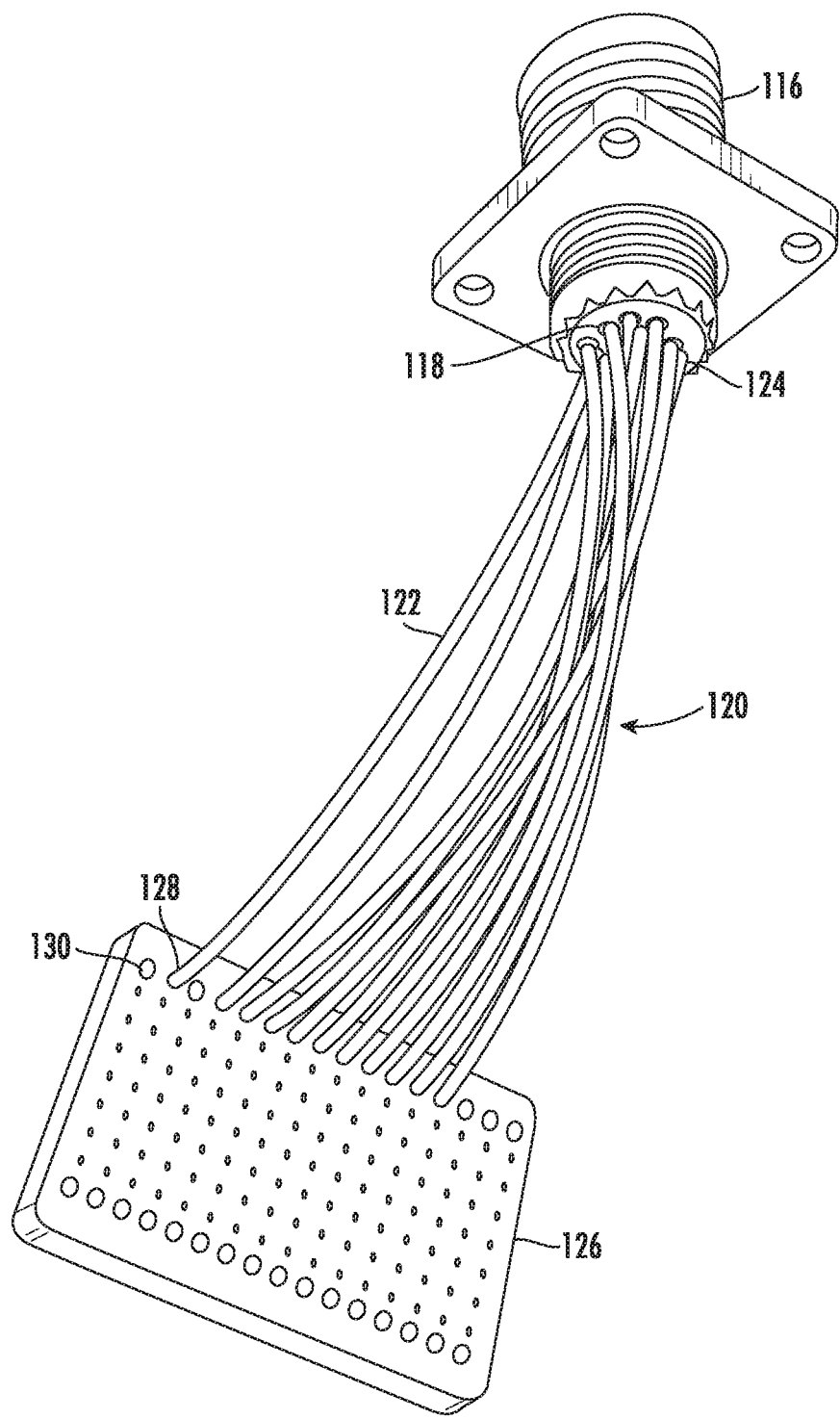
FIG. 5 is an illustration of an example of a portion of an assembly of the device of FIG. 1A including a mating connector in accordance with an embodiment of the present disclosure.

Referring back to FIG. 1A, the assembly 106 includes a mating connector 116 that is connectable to the wiring harness connector 102. Referring also to FIG. 5, FIG. 5 is an illustration of an example of a portion of the assembly 106 of the device 101 including a mating connector 116 in accordance with an embodiment of the present disclosure. The mating connector 116 includes a plurality of openings 118 extending through the mating connector 116. Each of the plurality of openings 118 aligns with a corresponding pin cavity 108 (FIG. 2) of the wiring harness connector 102 when the mating connector 116 is connected to the wiring harness connector 102 for inserting a selected wire 103a into the wiring harness connector 102.

The assembly 106 also includes a fiber optic cable 120 including a plurality of optical fibers 122 as best shown in FIG. 5. A first end 124 (FIGS. 1B and 5) of each optical fiber 122 is inserted into a respective opening 118 of the plurality of openings 118 of the mating connector 116.

The assembly 106 additionally includes an optical interface adapter 126 configured to optically couple a second end 128 (FIGS. 1B and 5) of each optical fiber 122 to an associated LED 300 of the array of LEDs 300. The optical interface adapter 126 includes a plurality of openings 130 extending through the optical interface adapter 126. The second end 128 of each optical fiber 122 is inserted one of the openings 130 to optically couple the second end 128 of each optical fiber 122 to an associated LED 300 of the array of LEDs 300 (FIG. 3).

Figure 6:
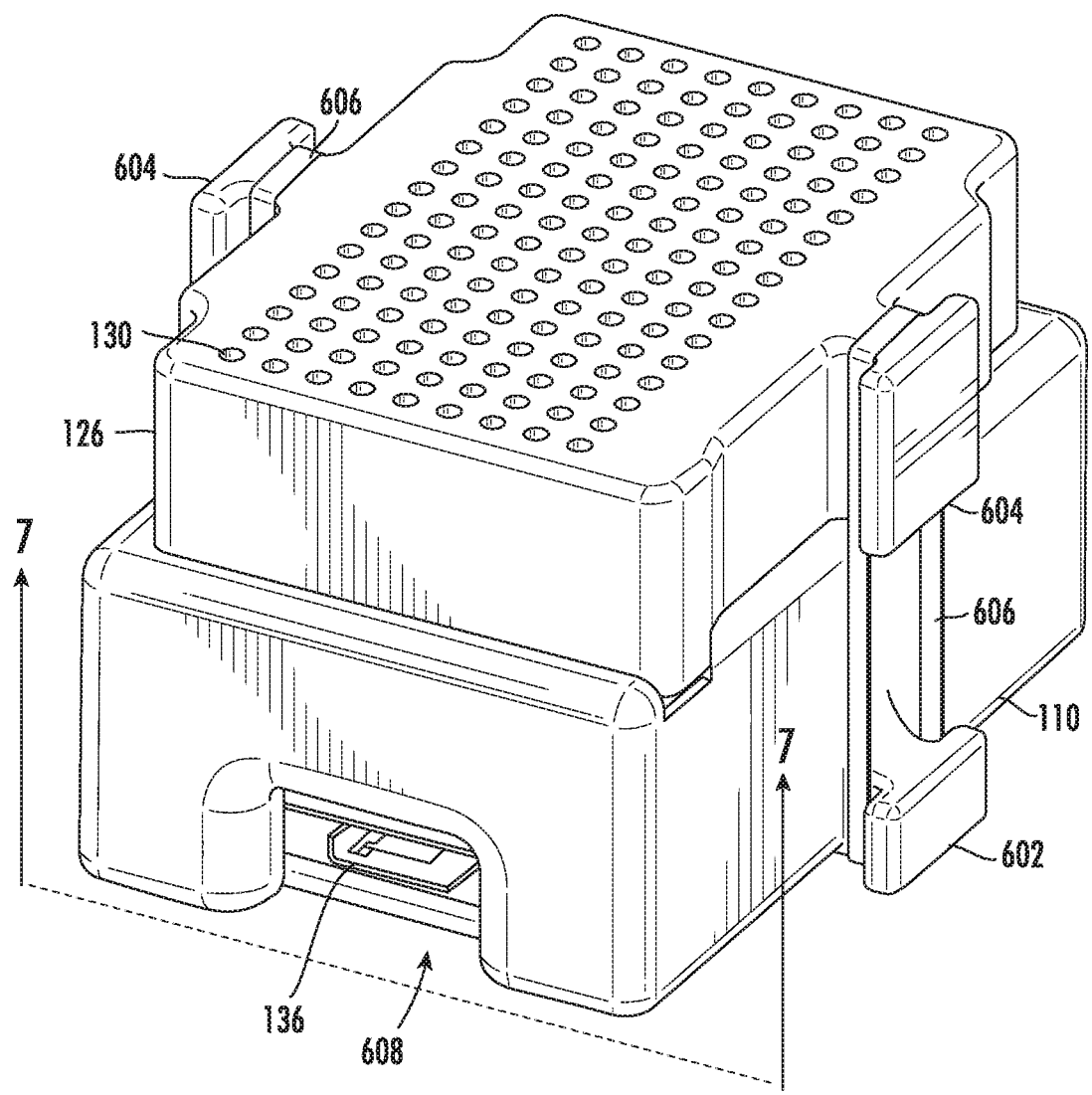
FIG. 6 is an illustration an example of a light emitting diode (LED) matrix housing and a mating optical interface adapter in accordance with an embodiment of the present disclosure.

Referring also to FIG. 6, FIG. 6 is an illustration an example of a light emitting diode (LED) matrix housing 110 and a mating optical interface adapter 126 in accordance with an embodiment of the present disclosure. The optical interface adapter 126 is configured to releasably attach to the housing 110 with the second end 128 of each optical fiber 122 interfacing with the associated LED 300 of the array of LEDs 300 to receive light from the associated LED 300 when illuminated as illustrated in FIG. 1B. The optical fibers 122 are not shown in FIG. 6 for purposes of clarity. The assembly 106 is releasably attached to the LED matrix housing 110 by the optical interface adapter 126 which is a component of the assembly 106. In accordance with an example, the LED matrix housing 110 includes tabs 602 on opposite sides of the LED matrix housing 110 and the optical interface adapter 126 also includes tabs 604 on opposite sides of the optical interface adapter 126. The tabs 602 and 604 each include a T-shaped configuration for receiving a resilient band 606 wrapped around the tabs 602 and 604 to retain the LED matrix housing 110 in contact with the optical interface adapter 126 when assembled for performing insertion of wires into the wiring harness connector 102 as described herein. Any arrangement for releasably fastening the LED matrix housing 110 and the optical interface adapter 126 together is also usable.

The assembly 106 is interchangeable with one or more other assemblies 106 by detachment from the LED matrix housing 110. Each of the other assemblies 106 is configured for rear illumination 113 (FIG. 1B) of respective pin cavities 108 of a different type of wiring harness connector 102 for inserting wires 103 in the different type of wiring harness connector 102. Examples of the different types of wiring harness connectors 102 include but are not necessarily limited to different numbers of wires associated with the wiring harness connector 102, different arrangements of patterns of pin cavities 108 depending upon a particular design and/or application of the wiring harness connector 102, different sizes of wiring harness connectors, different gauges or sizes of wires, etc. Each of the other assemblies 106 includes a mating connector 116 that is connectable to a certain type of wiring harness connector 102.

Figure 7:
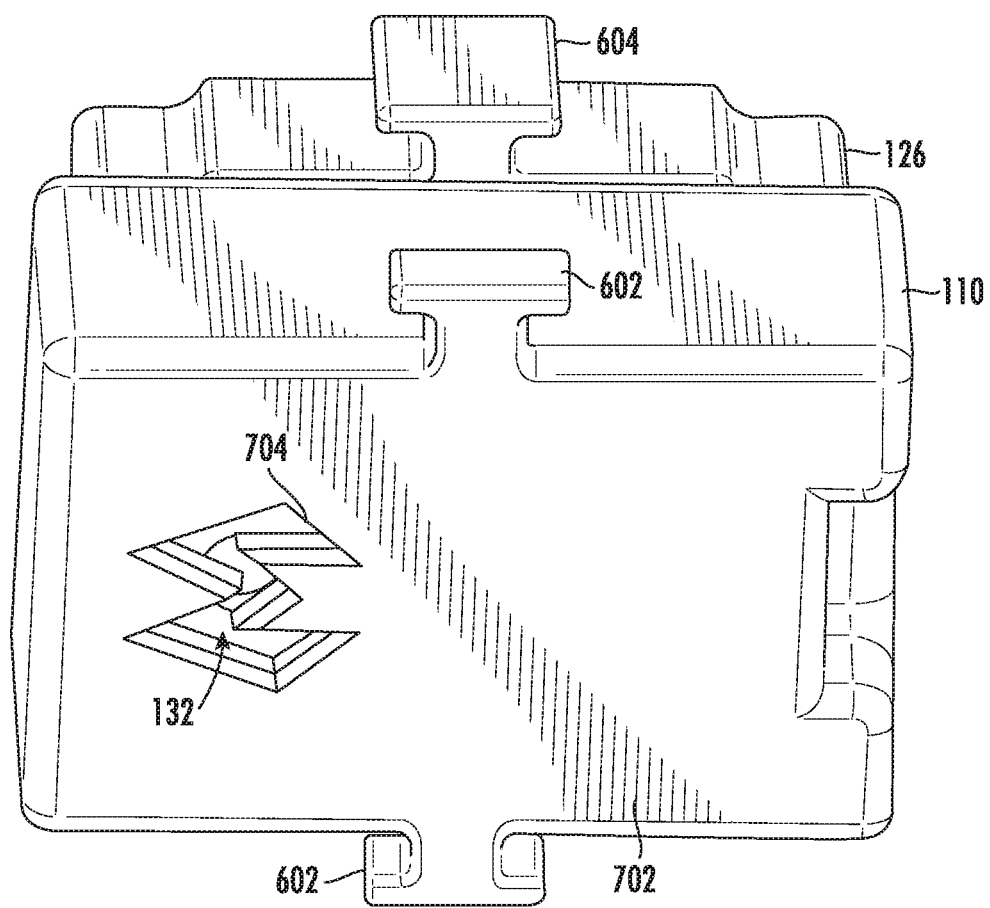
FIG. 7 is an illustration of the LED matrix housing viewed in a direction of lines 7-7 in FIG. 6.

Referring to FIG. 4, FIG. 4 is a perspective view of an example of a circuit board 134 including the microprocessor 112 for controlling operation of the array of LEDs 300 in accordance with an embodiment of the present disclosure. In accordance with an example, the device 101 also includes a speaker 132 electrically connected to the microprocessor 112. The speaker 132 is also mounted to the circuit board 134. The speaker 132 is configured to provide an audible signal in response to receiving an identification of a selected wire 103a or a next selected wire 103a for insertion into the wiring harness connector 102. Referring also to FIG. 7, FIG. 7 is an illustration of the LED matrix housing 110 viewed in a direction of lines 7-7 in FIG. 6. A side 702 of the LED matrix housing 110 opposite the array of LEDs 300 and the optical interface adapter 126 includes an opening 704 through which the audible signal from the speaker 132 can be heard by a user.

In the example in FIG. 4, an electrical connector 136 is also mounted to the circuit board 134. The electrical connector 136 is configured to receive a mating connector 138 (FIG. 1A) of an electrical cable 140 to supply electrical power 142 to the microprocessor 112 and to provide data signals 144 to the microprocessor 112. The electrical connector 136 is accessible through a side opening 608 in the LED matrix housing 110 as shown in FIG. 6. The data signals 144 include the identifications of respective, selected wires 103a for insertion into the wiring harness connector 102. The data signals 144 are received by the device 101 for rear illumination 113 (FIG. 1B) of particular pin cavities 108a based on the identifications of the selected wires 103a for insertion of the selected wires 103a into the correct pin cavities 108 of the wiring harness connector 102. In accordance with an example, the electrical cable 140 is a universal serial bus (USB) cable. Other types of electrical cables capable of transmitting both electrical power 142 and data signals 144 are also usable. The electrical cable 140 is connectable to a computer system 146 to supply the electrical power 142 to the device 101 and to provide the data signals 144 to the microprocessor 112 in response to the computer system 146 receiving the identification of a selected wire 103a or a next selected wire 103a from a user.

In accordance with the example illustrated in FIGS. 1A and 1B, the computer system 146 is considered to be a component of the system 100 for inserting wires 103 into a wiring harness connector 102. The computer system 146 includes a processor 150 and a memory 152 associated with the processor 150. The memory 152 includes computer-readable program instructions 154 that, when executed by the processor 150, causes the processor 150 to perform a set of functions 156 for wire identification and corresponding pin cavity backlighting 158 or rear illumination 113 (FIG. 1B) as described herein. An example of a method 800 for inserting wires into a wiring harness connector 102 is described with reference to FIG. 8. The method 800 includes the set of functions 156 and is embodied in a performed by the system 100 and the device 101.

The computer system 146 also includes an electrical power supply 160 and an input/output (I/O) interface 162. The electrical power supply 160 supplies the electrical power 142 to the device 101. The I/O interface 162 allows a user to control operation of the system 100 and device 101. In accordance with an example, the I/O interface 162 includes a connector 164 for receiving the electrical cable 140. As previously described, an example of the electrical cable 140 is a USB cable.

In accordance with the example in FIG. 1A, the I/O interface 162 also includes a keyboard 166, keypad, computer pointing device, etc., or similar mechanisms for receiving inputs from a user. The I/O interface 162 also includes a display 168 for presenting data to the user. The keyboard 166 or other input mechanism is used to enter an identification of a selected wire 103a (FIG. 1B) for insertion into the wiring harness connector 102 using rear illumination 113 or backlighting as described herein. In accordance with an example, the system 100 includes a barcode scanner 170 for scanning a barcode associated with a selected wire 103a for entering the identification of the selected wire 103a for insertion into the wiring harness connector 102.

Figure 8:
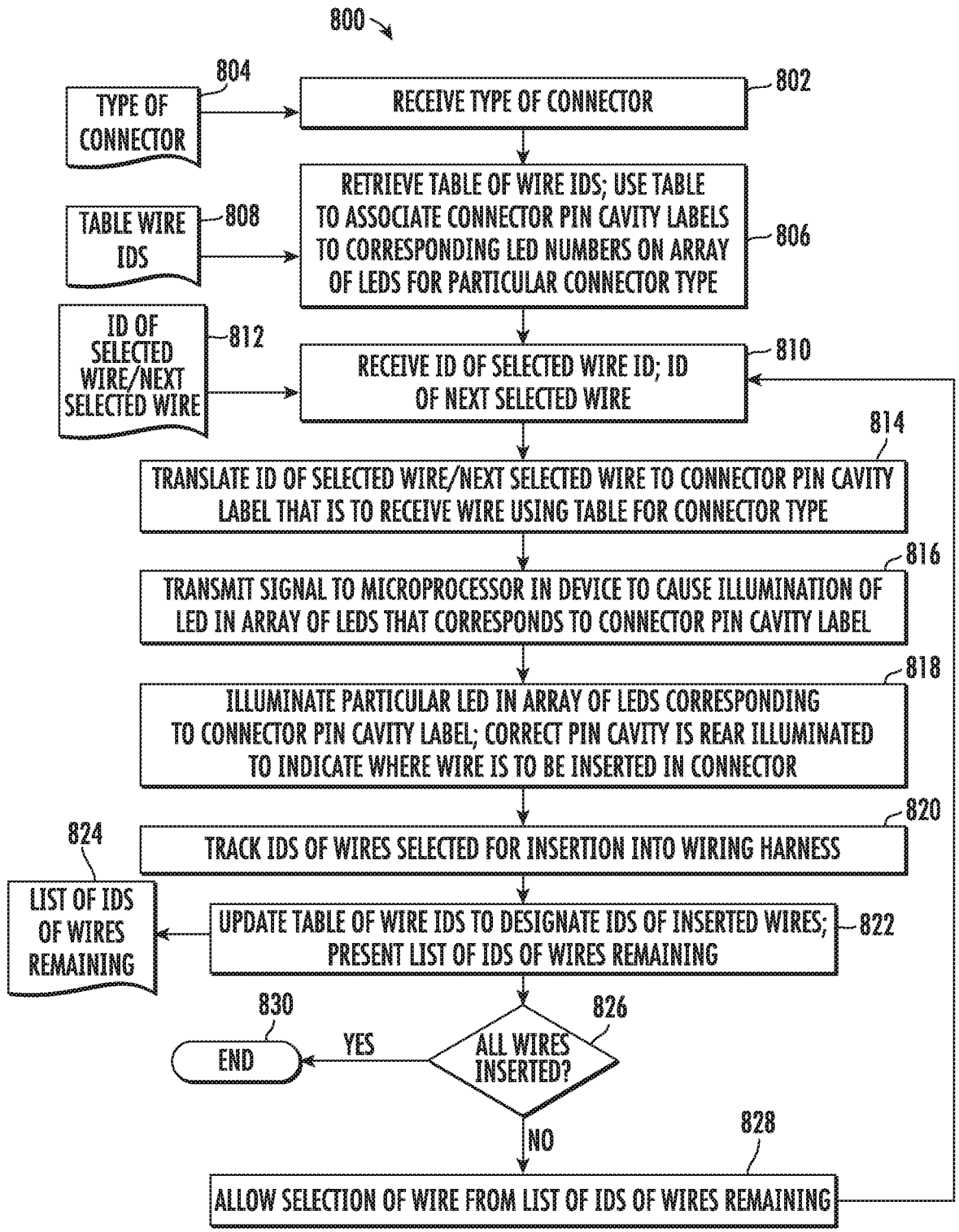
FIG. 8 is a flow chart of an example of a method for inserting wires into a wiring harness connector in accordance with an embodiment of the present disclosure.

FIG. 8 is a flow chart of an example of a method 800 for inserting wires 103 into a wiring harness connector 102 in accordance with an embodiment of the present disclosure. In accordance with an embodiment, the method 800 is embodied in and performed by the system 100 in FIG. 1. In block 802, a type 804 of wiring harness connector 102 is received. In accordance with an example, the type 804 of wiring harness connector 102 is received by being entered by a user into the system 100, for example, using the I/O interface 162 of the computer system 146 in FIG. 1A. As previously described, the device 101 includes different interchangeable assemblies 106. Each different interchangeable assembly 106 is configured for inserting wires into a different type 804 of wiring harness connector 102. Each different interchangeable assembly 106 includes a different mating connector 116 corresponding to a different type 804 of wiring harness connector 102. Examples of the different types 804 of wiring harness connectors 102 include but are not necessarily limited to wiring harness connectors 102 with different numbers of wires, different arrangements of patterns of pin cavities 108 for inserting wires, different sizes of connectors, different gauges or sizes of wires etc.

Figure 9:
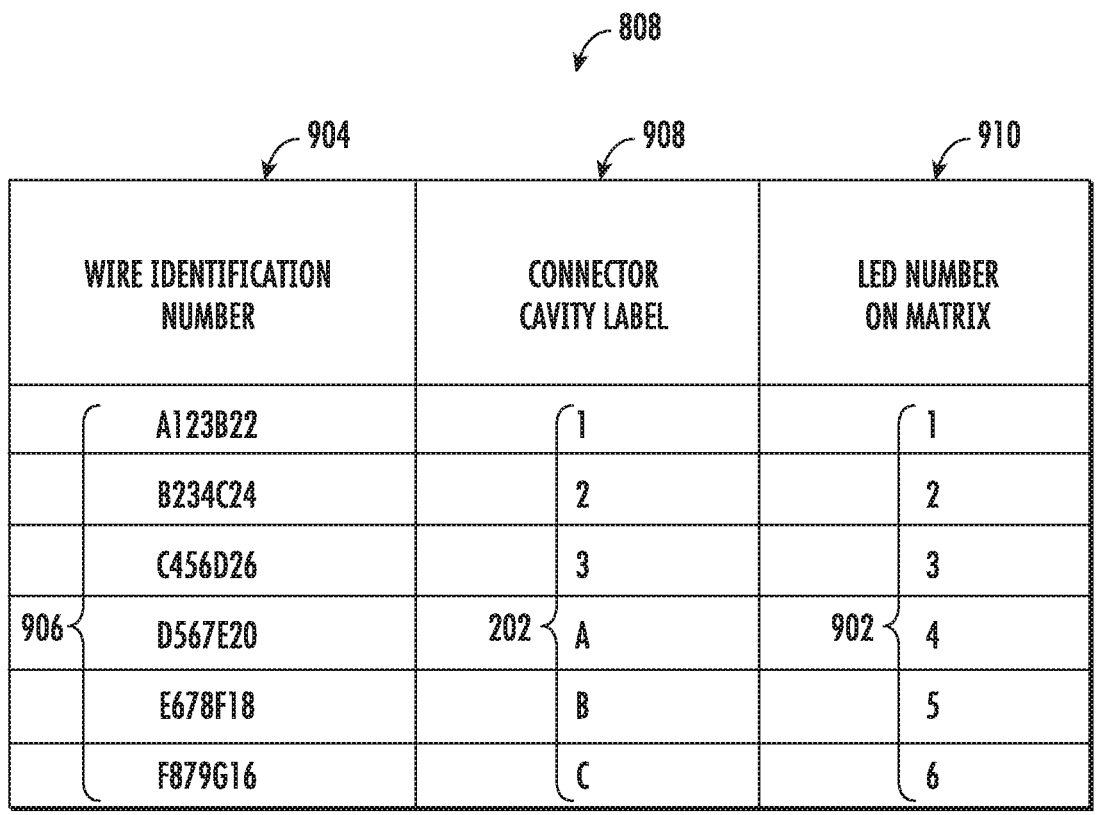
FIG. 9 is an example of a table of wire identifications to associate connector pin cavity labels to corresponding LED numbers on an LED matrix in accordance with an embodiment of the present disclosure.

In block 806, a table of wire identifications (IDs) 808 based on the type 804 of the wiring harness connector 102 is retrieved. The table of wire identifications 808 is used to associate pin cavity labels 202 (FIG. 2) on the wiring harness connector 102 to corresponding LED numbers in the array of LEDs 300 (FIG. 3) for the particular connector type 804 to cause rear illumination 113 of a particular pin cavity 108a (FIG. 1B and FIG. 2) based on the identification of the selected wire 103a in the table of wire identifications 808. Referring also to FIG. 9, FIG. 9 is an example of a table of wire identifications 808 to associate connector pin cavity labels 202 to corresponding LED numbers 902 of an array of LEDs 300 or LED matrix 302 (FIG. 3) in accordance with an embodiment of the present disclosure. In accordance with the example in FIG. 9, the table of wire identifications 808 includes a first column 904 including wire identification numbers 906, a second column 908 including connector pin cavity labels 202, and a third column 910 including LED numbers 902 of an LED matrix 302. For each row of the table of wire identifications 808, the wire identification number 906 of the selected wire 103a corresponds to the connector pin cavity label 202 in the second column 908 of the particular pin cavity 108a, which is to be rear illuminated 113 for insertion of the selected wire 103a, and the corresponding LED number 902 in the third column of the particular LED 300a of the LED matrix 302 or array of LEDs 300, which is to be illuminated to cause rear illumination 113 of the particular pin cavity 108a for insertion of the selected wire 103a.

In block 810, an identification 812 of a selected wire 103a for insertion into the wiring harness connector 102 is received.

In block 814, the identification 812 of the selected wire 103a is translated to the particular pin cavity 108a that is to receive the selected wire 103a using the table of wire identifications 808 for the wiring harness connector 102 based on the type 804 of the wiring harness connector 102.

In block 816, a data signal 144 (FIG. 1A) is transmitted to the microprocessor 112 of the device 101 to cause illumination of a particular LED 300a in the array of LEDs 300 that corresponds to the connector pin cavity label 202 for the wire identification number 906 (FIG. 9) of the selected wire 103a based on the table of wire identifications 808 for the type 804 of wiring harness connector 102.

In block 818, a particular pin cavity 108a of a plurality of pin cavities 108 of the wiring harness connector 102 is rear illuminated 113 (FIG. 1B) by light 107 from a light source 104 to indicate the particular pin cavity 108a where the selected wire 103a is to be inserted into the wiring harness connector 102 based on the identification 812 of the selected wire 103a. As previously described with respect to the example in FIGS. 1A and 1B, the light source 104 is an array of LEDs 300 (FIG. 3). The particular LED 300a of the array of LEDs 300 is illuminated based on the identification 812 of the selected wire 103a. Illumination of the particular LED 300a causes the rear illumination 113 (FIG. 1B) of the particular pin cavity 108a where the selected wire 103a is to be inserted into the wiring harness connector 102 based on the identification 812 of the selected wire 103a.

In block 820, the identifications of wires 103 selected for inserting into the wiring harness connector 102 are tracked. The method 800 tracks if all wires 103 have been inserted into the wiring harness connector 102 in block 820.

In block 822, the table of wire identifications 808 is updated to designate the identifications of wires 103 that have been selected for insertion. In accordance with an example, a list of identifications of wires remaining 824 to be inserted into the wiring harness connector 102 is presented. In accordance with the example in FIG. 1, the list of identifications of the wires remaining 824 is presented on the display 168 to allow the user to select from the list of identifications of wires remaining 824 to be inserted into the wiring harness connector 102.

In block 826, a determination is made whether all wires 103 have been inserted in the wiring harness connector 102. In accordance with an example, the determination is made by tracking if all wires 103 have been inserted into the wiring harness connector 102. If all wires 103 have been inserted into the wiring harness connector 102, the method 800 ends at block 830.

If all wires 103 have not been inserted into the wiring harness connector 102 for the particular type 804 of connector in block 826, the method 800 advances to block 828. In block 828, selection is allowed from the list of identifications of wires remaining 824 to be inserted into the wiring harness connector 102. The method 800 returns to block 810. In block 810, an identification 812 of a next selected wire 103a for insertion into the wiring harness connector 102 is received in response to there being wires remaining to be inserted into the wiring harness connector 102. The method 800 then continues similar to that previously described. A particular pin cavity 108a is rear illuminated 113 (FIG. 1B) where the next selected wire 103a is to be inserted into the wiring harness connector 102 based on the identification 812 of the next selected wire 103a until all wires 103 (FIG. 1B) have been inserted into the wiring harness connector 102 in block 826.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method for inserting wires into a wiring harness connector, comprising:
   receiving an identification of a selected wire for insertion into the wiring harness connector;
   rear illuminating a particular pin cavity of a plurality of pin cavities of the wiring harness connector by light from a light source to indicate the particular pin cavity where the selected wire is to be inserted into the wiring harness connector, wherein the particular pin cavity is rear illuminated based on the identification of the selected wire received;
   tracking if all wires have been inserted into the wiring harness connector;
   receiving an identification of a next selected wire for insertion into the wiring harness connector in response to wires remaining to be inserted into the wiring harness connector; and
   rear illuminating a particular pin cavity where the next selected wire is to be inserted into the wiring harness connector based on the identification of the next selected wire until all wires have been inserted into the wiring harness connector.

2. The method of claim 1, further comprising translating the identification of the selected wire to the particular pin cavity that is to receive the selected wire using a table of wire identifications for the wiring harness connector based on a type of the wiring harness connector.

3. The method of claim 1, further comprising retrieving a table of wire identifications based on a type of the wiring harness connector, the table of wire identifications being used to associate pin cavity labels to corresponding light source numbers in an array of light sources to cause rear illumination of a particular pin cavity based on the identification of the selected wire in the table of wire identifications.

4. The method of claim 1, wherein the light source comprises an array of light emitting diodes (LEDs), the method further comprising illuminating a particular LED of the array of LEDs based on the identification of the selected wire, wherein illumination of the particular LED causes the rear illuminating of the particular pin cavity where the selected wire is to be inserted into the wiring harness connector based on the identification of the selected wire.

5. The method of claim 1, further comprising:
   tracking the identification of wires selected for inserting into the wiring harness connector; and
   updating a table of wire identifications to designate the identifications of wires that have been selected for insertion.

6. The method of claim 5, further comprising:
   presenting a list of identifications of wires remaining to be inserted into the wiring harness connector; and
   allowing selection from the list of identifications of wires remaining to be inserted into the wiring harness connector.

7. The method of claim 1, further comprising rear illuminating the particular pin cavity where a next selected wire is to be inserted into the wiring harness connector based on the identification of the next selected wire until all wires have been inserted into the wiring harness connector.

8. A system for inserting wires into a wiring harness connector, comprising:
   a processor; and
   a memory associated with the processor, the memory comprising computer-readable program instructions that, when executed by the processor causes the processor to perform a set of functions comprising:
   receiving an identification of a selected wire for insertion into the wiring harness connector;
   rear illuminating a particular pin cavity of a plurality of pin cavities of the wiring harness connector by light from a light source to indicate the particular pin cavity where the selected wire is to be inserted into the wiring harness, wherein the particular pin cavity is rear illuminated based on the identification of the selected wire received;
   tracking if all wires have been inserted into the wiring harness connector;
   receiving an identification of a next selected wire for insertion into the wiring harness connector in response to wires remaining to be inserted into the wiring harness connector; and
   rear illuminating a particular pin cavity where the next selected wire is to be inserted into the wiring harness connector based on the identification of the next selected wire until all wires have been inserted into the wiring harness connector.

9. The system of claim 8, further comprising a device for inserting wires into the wiring harness connector, wherein the device comprises:
the light source; and
an assembly to cause the rear illumination of the particular pin cavity of the plurality of pin cavities of the wiring harness connector by light from the light source to indicate the particular pin cavity where a selected wire is to be inserted into the wiring harness connector based on the identification of the selected wire.

10. The system of claim 9, wherein the light source comprises an array of light sources.

11. The system of claim 10, wherein the array of light sources comprises an array of light emitting diodes (LEDs) arranged in a matrix comprising a predetermined number of columns and rows of LEDs.

12. The system of claim 10, wherein the device further comprises a microprocessor to control operation of the array of light sources, the microprocessor being configured to illuminate the particular light source of the array of light sources based on the identification of the selected wire, wherein illumination of the particular light source causes the rear illumination of a corresponding pin cavity of the wiring harness connector to indicate the particular pin cavity where the selected wire is to be inserted into the wiring harness connector based on the identification of the selected wire.

13. The system of claim 10, wherein the device further comprises a housing enclosing a microprocessor to control operation of the array of light sources, the array of light sources being mounted on a side of the housing, wherein the assembly is releasably attachable to the housing to receive light from the array of light sources.

14. The system of claim 10, wherein the assembly comprises:
a mating connector that is connectable to the wiring harness connector, the mating connector comprising a plurality of openings extending through the mating connector, wherein each of the plurality of openings aligns with a corresponding pin cavity of the wiring harness connector when the mating connector is connected to the wiring harness connector;
a fiber optic cable comprising a plurality of optical fibers, a first end of each optical fiber being inserted into a respective opening of the plurality of openings of the mating connector; and
an optical interface adapter configured to optically couple a second end of each optical fiber to an associated light source of the array of light sources.

15. The system of claim 14, wherein the optical interface adapter is configured to releasably attach to a housing comprising the array of light sources, the second end of each optical fiber interfacing with the associated light source of the array of light sources to receive light from the associated light source when illuminated.

16. The system of claim 9, wherein the assembly is interchangeable with one or more other assemblies, each other assembly being configured for rear illumination of respective pin cavities in a different type wiring harness connector for inserting wires in the different type wiring harness connector.

17. The system of claim 16, wherein each other assembly comprises a mating connector that is connectable to a certain type wiring harness connector.

18. The system of claim 9, further comprising a speaker electrically connected to a microprocessor, the speaker being configured to provide an audible signal in response to receiving an identification of a next selected wire for insertion into the wiring harness connector.

19. The system of claim 9, further comprising a universal serial bus (USB) cable, wherein the USB cable is connectable to a computer system to supply electrical power to the device and to provide data signals to a microprocessor in response to the computer system receiving the identification of the selected wire from a user.

20. A system for inserting wires into a wiring harness connector, comprising:
a processor; and
a memory associated with the processor, the memory comprising computer-readable program instructions that, when executed by the processor causes the processor to perform a set of functions comprising:
receiving an identification of a selected wire for insertion into the wiring harness connector; and
rear illuminating a particular pin cavity of a plurality of pin cavities of the wiring harness connector by light from a light source to indicate the particular pin cavity where the selected wire is to be inserted into the wiring harness, wherein the particular pin cavity is rear illuminated based on the identification of the selected wire received;
wherein the system further comprises a device, the device comprising
the light source; and
an assembly to cause the rear illumination of the particular pin cavity of the plurality of pin cavities of the wiring harness connector by light from the light source to indicate the particular pin cavity where a selected wire is to be inserted into the wiring harness connector based on the identification of the selected wire, wherein the assembly comprises:
a mating connector that is connectable to the wiring harness connector, the mating connector comprising a plurality of openings extending through the mating connector, wherein each of the plurality of openings aligns with a corresponding pin cavity of the wiring harness connector when the mating connector is connected to the wiring harness connector;
a fiber optic cable comprising a plurality of optical fibers, a first end of each optical fiber being inserted into a respective opening of the plurality of openings of the mating connector; and
an optical interface adapter configured to optically couple a second end of each optical fiber to the light source.

21. The system of claim 20, wherein the assembly is interchangeable with one or more other assemblies, each other assembly being configured for rear illumination of respective pin cavities in a different type wiring harness connector for inserting wires in the different type wiring harness connector.

* * * * *